(12) United States Patent
Kumar et al.

(10) Patent No.: US 11,174,410 B2
(45) Date of Patent: Nov. 16, 2021

(54) METHOD FOR COATING A PIPELINE FIELD JOINT

(71) Applicant: Dow Global Technologies LLC, Midland, MI (US)

(72) Inventors: Bhawesh Kumar, Lake Jackson, TX (US); Mark W. Brown, II, Richwood, TX (US); Rujul M. Mehta, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/759,236

(22) PCT Filed: Nov. 8, 2018

(86) PCT No.: PCT/US2018/059720
§ 371 (c)(1),
(2) Date: Apr. 24, 2020

(87) PCT Pub. No.: WO2019/099266
PCT Pub. Date: May 23, 2019

(65) Prior Publication Data
US 2020/0354601 A1  Nov. 12, 2020

Related U.S. Application Data

(60) Provisional application No. 62/587,093, filed on Nov. 16, 2017.

(51) Int. Cl.
*B29C 45/14*        (2006.01)
*C09D 123/14*       (2006.01)
(Continued)

(52) U.S. Cl.
CPC ........ *C09D 123/14* (2013.01); *B29C 45/0001* (2013.01); *B29C 45/14598* (2013.01);
(Continued)

(58) Field of Classification Search
None
See application file for complete search history.

(56) References Cited

U.S. PATENT DOCUMENTS 3,013,925 A * 12/1961 Larsen .............. B29C 66/91231
                                                264/248
3,236,917 A    2/1966 Nata et al.
(Continued)

FOREIGN PATENT DOCUMENTS

CN      102109070     *   6/2011
CN      109233073     *   1/2019
(Continued)

OTHER PUBLICATIONS

Fujimoto, "Multiple-Pulse Nuclear Magnetic Resonance Experiments on Some Crystalline Polymers," Polymer Journal, 1972, p. 448-462, vol. 3, No. 4.
(Continued)

*Primary Examiner* — Edmund H Lee

(57) ABSTRACT

The present invention relates to a method of coating a pipeline field joint comprising the steps of (a) applying a layer of a coating material composition comprising (i) a propylene polymer and (ii) a substantially linear ethylene copolymer, a linear ethylene copolymer, or mixtures thereof, to the uncoated region of the field joint, preferably the coating is applied by injection molding.

8 Claims, 3 Drawing Sheets

Figure 1:
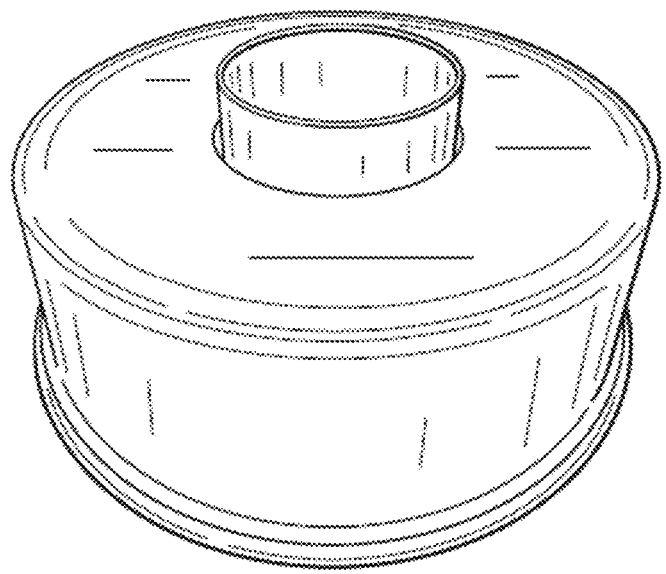

(51) Int. Cl.
  *B29C 45/00* (2006.01)
  *F16L 58/18* (2006.01)
  *B29K 23/00* (2006.01)
  *B29K 705/00* (2006.01)
  *B29L 31/24* (2006.01)

(52) U.S. Cl.
  CPC ........ *F16L 58/181* (2013.01); *B29K 2023/12* (2013.01); *B29K 2705/00* (2013.01); *B29L 2031/24* (2013.01)

(56) References Cited

U.S. PATENT DOCUMENTS

| | | | |
|---|---|---|---|
| 3,424,703 A | | 1/1969 | Jones, Jr. |
| 3,645,992 A | | 2/1972 | Elston |
| 3,846,208 A | * | 11/1974 | McElroy ............. B29C 66/1142 |
| | | | 156/499 |
| 4,701,432 A | | 10/1987 | Welborn, Jr. |
| 4,798,081 A | | 1/1989 | Hazlitt et al. |
| 4,905,541 A | | 3/1990 | Man |
| 4,935,397 A | | 6/1990 | Chang |
| 4,937,299 A | | 6/1990 | Ewen et al. |
| 4,937,301 A | | 6/1990 | Chang |
| 5,055,438 A | | 10/1991 | Canich |
| 5,091,461 A | | 2/1992 | Skochdopole |
| 5,194,509 A | | 3/1993 | Hasenbein et al. |
| 5,272,236 A | | 12/1993 | Lai et al. |
| 5,278,272 A | | 1/1994 | Lai et al. |
| 8,415,447 B2 | | 4/2013 | Rydin et al. |
| 2005/0025922 A1 | * | 2/2005 | Rydin ................... B32B 5/18 |
| | | | 428/36.91 |
| 2011/0248072 A1 | * | 10/2011 | Leiden .................. B05D 7/148 |
| | | | 228/199 |
| 2013/0170913 A1 | * | 7/2013 | Hoffmann ........ B29C 45/14491 |
| | | | 405/166 |
| 2014/0035186 A1 | * | 2/2014 | Recher ................... C08L 65/00 |
| | | | 264/162 |
| 2015/0074978 A1 | | 3/2015 | Stephenson et al. |
| 2016/0280900 A1 | | 9/2016 | Purmonen et al. |
| 2017/0232649 A1 | * | 8/2017 | Wright ............... F16L 13/0272 |
| | | | 285/55 |

FOREIGN PATENT DOCUMENTS

| | | |
|---|---|---|
| EP | 260999 | 3/1988 |
| EP | 129368 | 7/1989 |
| EP | 391413 | 10/1990 |
| EP | 639613 | 2/1995 |
| WO | 90/07526 | 7/1990 |
| WO | 2007096209 | 8/2007 |
| WO | 2015090594 | 6/2015 |
| WO | 2017/019679 | 2/2017 |

OTHER PUBLICATIONS

Wild, "Determination of Branching Distributions in Polyethylene and Ethylene Copolymers," Journal of Polymer Science, 1982, p. 441-455, vol. 20, John Wiley & Sons, Inc.

PCT/US2018/059720, International Search Report and Written Opinion dated Jan. 17, 2019.

* cited by examiner

Compressive stress due to shrinkage of polymer

F = push-out force

METHOD FOR COATING A PIPELINE FIELD JOINT

FIELD OF THE INVENTION

The present invention relates to improvements in coating pipes, and in particular to a method for coating pipeline field joints and a coated pipeline field joint.

BACKGROUND OF THE INVENTION

Pipelines used in the oil and gas industry are usually formed of lengths of steel pipe welded together end-to-end as the pipeline is laid. It is also common to fabricate a pipe stalk onshore at a spoolbase and to transport the prefabricated pipe offshore for laying, for example in a reel-lay operation in which pipe stalks are welded together and stored in a compact spooled form on a pipelay vessel.

To mitigate corrosion of the pipeline and optionally also to insulate the fluids that the pipeline carries in use, the pipe joints are pre-coated with protective coatings that, optionally, are also thermally insulating. Many variations are possible in the structure and composition of the coating to obtain the required protective or insulative properties. However, polypropylene (PP) is most commonly used to coat the pipe joints from which pipelines are made. For example, a so-called three-layer PP (3LPP) coating may be used for corrosion protection and a so-called five-layer PP (5LPP) coating may be used for additional thermal insulation. Additional layers are possible.

A 3LPP coating typically comprises an epoxy primer applied to the cleaned outer surface of the steel pipe joint. As the primer cures, a second thin layer of PP is applied so as to bond with the primer and then a third, thicker layer of extruded PP is applied over the second layer for mechanical protection. A 5LPP coating adds two further layers, namely a fourth layer of PP modified for thermal insulation e.g. glass syntactic PP (GSPP) or a foam, surrounded by a fifth layer of extruded PP for mechanical protection of the insulating fourth layer.

A short length of pipe is left uncoated at each end of the pipe joint to facilitate welding. The resulting 'field joint' must be coated with a field joint coating to mitigate corrosion and to maintain whatever level of insulation may be necessary for the purposes of the pipeline.

Two common processes for coating field joints of pipelines formed from polypropylene coated pipes are the Injection Molded Polypropylene (IMPP) and Injection Molded Polyurethane (IMPU) techniques.

An IMPP coating is typically applied by first blast cleaning and then heating the pipe using induction heating, for instance. A layer of powdered fusion bonded epoxy (FBE) primer is then applied to the heated pipe, together with a thin adhesive layer of polypropylene, which is added during the curing time of the FBE. Exposed chamfers of factory applied coating on the pipe are then heated. The field joint is then completely enclosed by a heavy duty, high pressure mold that defines a cavity around the uncoated ends of the pipes, which is subsequently filled with molten polypropylene. Once the polypropylene has cooled and solidified, the mold is removed leaving the field joint coating in place.

Because the polypropylene used for re-insulation has broadly similar mechanical and thermal properties to the pipe coating of PP, the pipe coating and the field joint coating are sufficiently compatible that they fuse together at their mutual interface.

By contrast, an IMPU coating uses a chemically curable material instead of injecting polypropylene as the infill material in the IMPP field joint. Typically, the initial step in the IMPU technique is to apply a liquid polyurethane primer onto the exposed blast cleaned surface of the pipe. Once the primer has been applied, a mold is positioned to enclose the field joint in a cavity and the chemically curable material is injected into the cavity defined by the mold. The infill material is typically a two component urethane chemical. When the curing process is sufficiently advanced, the mold can be removed and the field joint coating can be left in place.

An IMPU process is advantageous because this process depends on a curing time versus a cooling time which can result in a shorter coating cycle. Further, the mold used in an IMPU operation does not need to withstand high pressures and so can be of compact, lightweight and simple design.

However, existing insulated pipelines comprising field joints with one of the above mentioned insulating materials, while demonstrating a number of significant advantages, can still have certain limitations, for example cracking. For instance, with PU coatings, shrinkage caused during curing may cause internal stresses that can lead to cracks in the insulation. Cracking may also occur when the insulation material and underlying steel equipment are heated and cooled. During heating the inner surface of the insulation material (adjacent the hot steel equipment) expands more than the outer surface of the insulation material (adjacent the cold sea water). This differential expansion may also cause cracking. During cooling, the insulation material shrinks more and faster than the steel equipment, causing more cracking.

New insulation materials which reduce internal stresses and cracking in the molded insulation have been disclosed, for example see US Publication No. 2015/0074978; WO 2017/019679; and copending U.S. provisional application No. 62/381,037. However, due to the chemically dissimilar nature of the new field joint coatings and the PP pipe coatings, the maximum bond strength that can be achieved between them and the polypropylene with conventional adhesive layers and/or primers is lower than the maximum bond strength that can be achieved between polypropylene/polypropylene or polyurethane/polypropylene. Because of this, there is a perceived risk that fractures may occur between the pipe and new non-PP field joint coatings, which is undesirable as it may allow water to penetrate the pipe coating causing corrosion of the pipe.

There exists a need for an improved adhesive layer material and coating process to adequately bond conventional PP pipe coatings with non-PP field joint coatings.

SUMMARY OF THE INVENTION

The present invention is a method of coating a pipeline field joint between two joined lengths of pipe, each length comprising a polypropylene pipe coating along part of its length and an uncoated end portion between where the polypropylene pipe coating ends and the field joint, the method comprising the steps of (a) applying a layer of a coating material composition comprising (i) a propylene polymer and (ii) a substantially linear ethylene copolymer (SLEP) and/or a linear ethylene copolymer (LEP) to the uncoated region of the field joint such that it overlaps with and extends continuously between the polypropylene pipe coating of each of the two lengths of pipe.

In one embodiment of the method disclosed herein above, the propylene polymer is a block or random propylene copolymer.

In one embodiment of the method disclosed herein above, the substantially linear ethylene polymer and/or linear ethylene polymer (ii) is characterized as having (a) a density of less than about 0.873 g/cc to 0.885 g/cc and/or (b) an $I_2$ of from greater than 1 g/10 min to less than 5 g/10 min.

In one embodiment of the method disclosed herein above, the SLEP and/or LEP is a copolymer of ethylene with one or more $C_3$ to $C_{20}$ alpha olefin, preferably a copolymer of ethylene and propylene, ethylene and 1-butene, ethylene and 1-hexene, ethylene and 1-octene, or a terpolymer of ethylene, propylene, and a diene comonomer.

In one embodiment of the method disclosed herein above, the SLEP and/or LEP is produced using a constrained geometry catalyst.

In one embodiment of the method disclosed herein above, (i) the propylene polymer is present in the coating composition in an amount of equal to or greater than 50 weight percent and equal to or less than 85 weight percent and (ii) the SLEP and/or LEP is present in the coating composition in an amount equal to or greater than 15 weight percent and equal to or less than 50 weight percent, wherein weight percents based on the total weight of the coating composition.

In one embodiment of the method disclosed herein above, the coating material composition is applied by injection molding.

In one embodiment the of the present invention is a method of coating a pipeline field joint between two joined lengths of pipe, each length comprising a polypropylene pipe coating along part of its length and an uncoated end portion between where the polypropylene pipe coating ends and the field joint, the method comprising the step of (a) fitting a split injection mold around the joined lengths of pipe such that it overlaps with and extends between the polypropylene pipe coating of each of the two lengths of pipe and (b) injection molding a coating material composition into injection mold, wherein the coating material composition comprises (i) a propylene polymer and (ii) a substantially linear ethylene copolymer (SLEP), a linear ethylene copolymer (LEP), or mixtures thereof.

A BRIEF DESCRIPTION OF THE DRAWINGS

Figure 2:
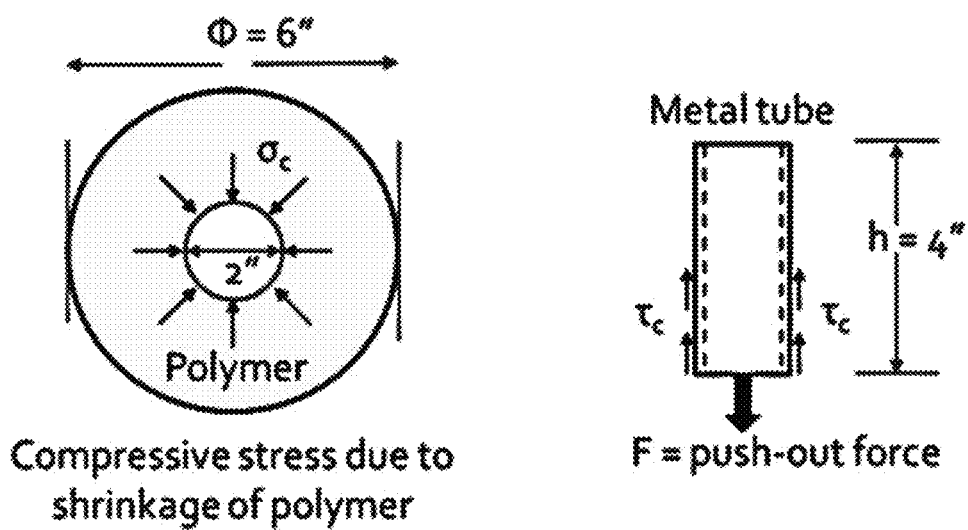
Figure 3:
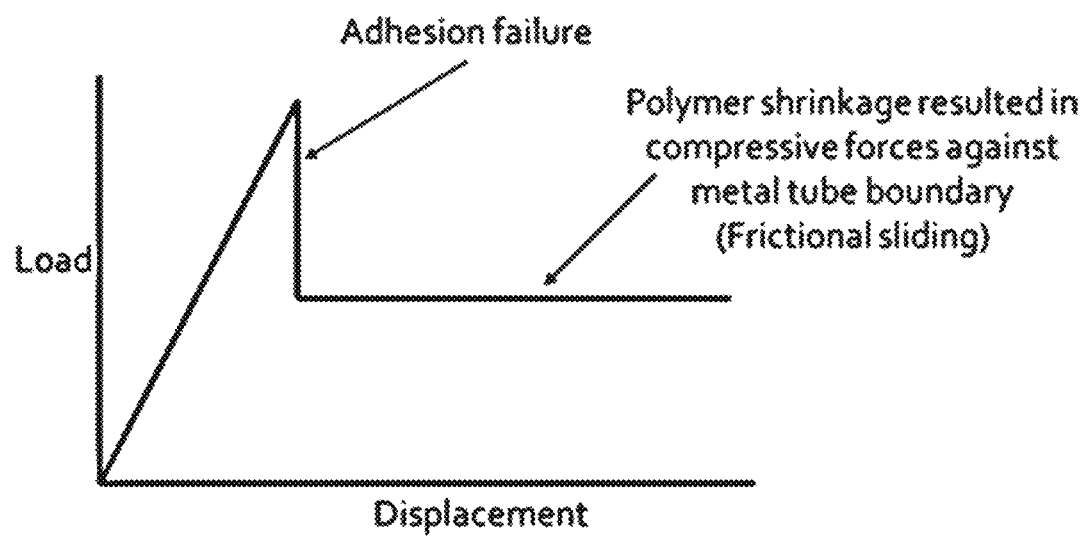
Figure 4:
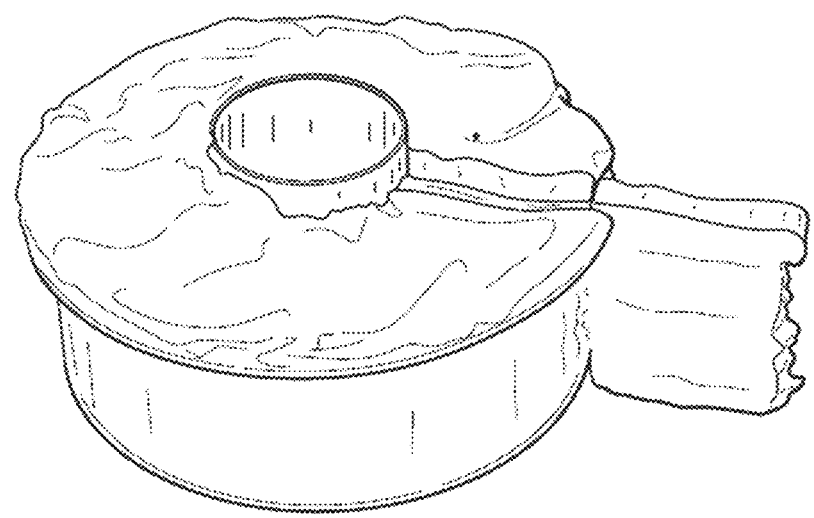
Figure 5:
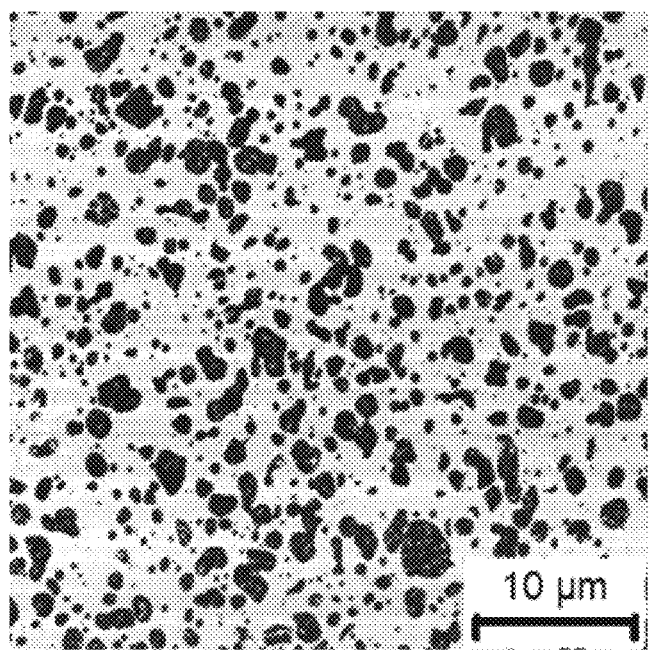
Figure 6:
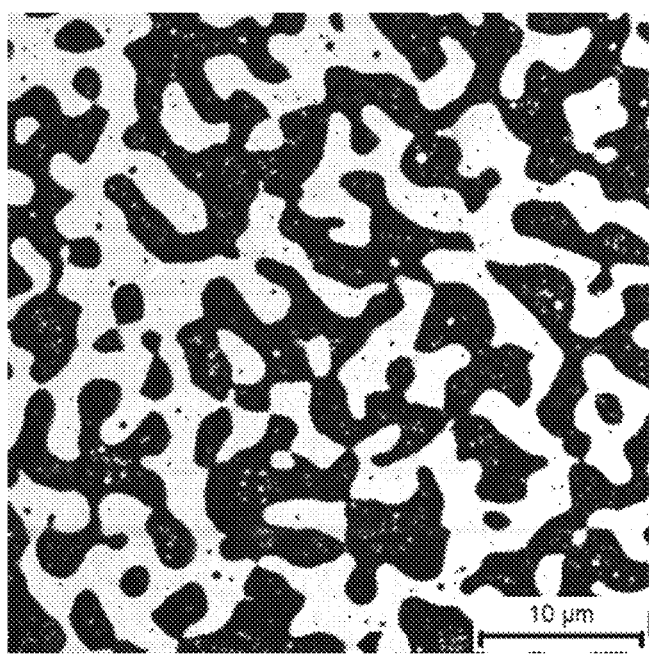

FIG. 1 is a photograph of ring shear specimen.
FIG. 2 is a schematic of the ring-shear experiment used to determine residual stress.
FIG. 3 is a schematic of the force-displacement curve in the ring-shear experiment.
FIG. 4 shows the locations on a tested ring-shear specimen that are analyzed for morphology.
FIG. 5 is a phase image of Comparative Example A.
FIG. 6 is a phase image of Example 1.

DETAILED DESCRIPTION OF THE INVENTION

One embodiment of the present invention is a method of coating a pipeline field joint between two joined lengths of pipe, each length being coated along part of its length, but not on the ends being joined, with a pipe coating, any suitable factory coating, but preferably a 3LPP or a 5LPP coating. Subsequent to welding the pipes together, the method comprises the steps of: i) applying a layer of a coating material composition to the uncoated region of the field joint (i.e., the uncoated ends of the pipes) such that it contacts and extends between the pipe coating of each of the two lengths of pipe.

In the method of the invention, the coating material composition is applied so as to overlap or cover at least some of the pipe coating on the uncovered end(s) of the joined pipes, to allow the coating material compositions to contact and form a resistant barrier to moisture and other contaminants.

In one embodiment of the process of the present invention, the coating material composition is applied by injection molding. For example, a split injection mold may be fit around the connected region of the field joint and the coating material composition is injected into the mold by conventional high pressure (i.e., IMPP) or low pressure (i.e., IMPU) injection molding techniques.

In some embodiments, the coating material composition has a relatively low viscosity which thereby reduces the pressure during injection and allows for the use of light-weight molds as compared to heavy duty, high pressure molds associated with some IMPP coating techniques.

In one embodiment of the process of the present invention, the field joint is cleaned prior to the application of the first coating material composition. Cleaning methods include surface dust wiping off, surface sanding, surface dissolve cleaning, scraping, and the like. Any suitable cleaning solution and/or procedure used for cleaning such pipe can be used.

The coating material composition suitable for the method of the present invention comprises, consists essentially of, or consists of (i) a propylene polymer and (ii) a substantially linear ethylene copolymer (SLEP) or a linear ethylene copolymer (LEP) or mixtures thereof, preferably the propylene polymer (i) and the substantially linear ethylene copolymer (SLEP), a linear ethylene copolymer (LEP), or mixtures thereof (ii) form co-continuous phases.

The first component (i) of the coating material composition is a propylene polymer. Propylene polymers suitable for use in this invention are well known in the literature and can be prepared by known techniques. The polypropylene may be in the isotactic form, although other forms can also be used (e.g., syndiotactic or atactic). The polypropylene used for the present invention is preferably a homopolymer of polypropylene or a copolymer, for example, a random or block copolymer, of propylene and an alpha-olefin, preferably a $C_2$ or $C_4$ to $C_{20}$ alpha-olefin. The alpha-olefin is present in the polypropylene of the present invention in an amount of not more than 20 percent by mole, preferably not more than 15 percent, even more preferably not more than 10 percent and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

In one embodiment of the present invention, a propylene homopolymer is the preferred polypropylene.

In one embodiment of the method disclosed herein above, the propylene polymer is a block or random propylene copolymer.

The polypropylene of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometallic component an organ aluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Polypropylene is commonly made by catalytically reacting propylene in a polymerization reactor with appropriate molecular weight control agents. Nucleating agents may be added after the reaction is completed during a melt processing step in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in Modern *Plastics Encyclopedia*/89, mid October 1988 Issue, Volume 65, Number 11, pp. 86-92, the entire disclosure of which is incorporated herein by reference. The molecular weight of the polypropylene for use in the present invention is conveniently indicated using a melt flow measurement, sometimes referred to as melt flow rate (MFR) or melt index (MI), according to ASTM D 1238 at 230° C. and an applied load of 2.16 kilogram (kg). Melt flow rate is inversely proportional to the molecular weight of the polymer. Thus, the higher the molecular weight, the lower the melt flow rate, although the relationship is not linear. The melt flow rate for the polypropylene useful herein is generally greater than about 0.1 g/10 min., preferably greater than about 0.5 g/10 min., more preferably greater than about 1 g/10 min., and even more preferably greater than about 10 g/10 min. The melt flow rate for the polypropylene useful herein is generally less than about 200 g/10 min, preferably less than about 100 g/10 min., more preferably less than about 75 g/10 min., and more preferably less than about 50 g/10 min.

The polypropylene polymer as component (i) may be characterized also by its crystalline structure.

One method to characterize crystallinity is by the pulse nuclear magnetic resonance (NMR) method of K. Fujimoto, T. Nishi and R. Kado, Polymer Journal Volume 3, 448-462 (1972) wherein crystalline phase (I), intermediate phase (II) and amorphous (III) phase are determined. Generally, the weight ratio of the crystalline phase (I)/the intermediate phase (II) is greater than about 4, preferably greater than about 5, more preferably greater than about 8 and most preferably greater than about 10. The content of the amorphous phase (III) is from at least about 1, preferably from at least about 2, more preferably from at least about 5, even more preferably from at least about 10 and most preferably from at least about 15 weight percent. The content of the amorphous phase (III) is less than about 40, preferably less than about 30, more preferably less than about 25, even more preferably less than 20 and most preferably less than about 15 percent by weight.

Generally, in pulse NMR determinations, an energy pulse is applied to a spinning polymer sample at high resolution over a specified range of temperature at specific temperature intervals (temperature in degrees Kelvin, ° K). The resulting energy is monitored in the time domain (microsecond time scale). The energy/time curve is a measure of the time needed for the polymer to return from the excited energy state back to its ground energy level. This is called the Free Induction Decay (FID) curve. The curve is then mathematically broken down into a fast Gaussian equation (usually associated with crystallinity), a slow Gaussian equation and one exponential equation. The last two equations are usually associated with the polymers amorphous phase and an intermediate phase that is between the crystallinity and amorphous properties, respectively. These equations are used to calculate coefficients that characterize the appropriate amplitude and time components of the FID curve. The coefficients are then placed in a matrix and undergo regression processes such as partial least squares. The crystalline, amorphous, and intermediate phases are calculated and reported as weight percents as a function of temperature, ° K.

However, a more preferable method of determining crystallinity in the polypropylene polymer is by differential scanning calorimetry (DSC). A small sample (milligram size) of the propylene polymer is sealed into an aluminum DSC pan. The sample is placed into a DSC cell with a 25 centimeter per minute nitrogen purge and cooled to about −100° C. A standard thermal history is established for the sample by heating at 10° C. per minute to 225° C. The sample is then cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity, \%} = \frac{\Delta H_{observed}}{\Delta H_{isotactic\,PP}} \times 100$$

where the heat of fusion for isotactic polypropylene (ΔHisotactic PP), as reported in B. Wunderlich, Macromolecular Physics, Volume 3, Crystal Melting, Academic Press, New Your, 1980, p 48, is 165 Joules per gram (J/g) of polymer.

The degree of crystallinity for the high crystalline propylene polymer as determined by DSC is at least about 62 weight percent, preferably at least about 64 weight percent, more preferably at least about 66 weight percent, even more preferably at least about 68 weight percent and most preferably at least about 70 weight percent based on the weight of the high crystalline propylene polymer. The degree of crystallinity for the high crystalline propylene polymer as determined by DSC is less than or equal to about 100 weight percent, preferably less than or equal to about 90 weight percent, more preferably less than or equal to about 80 weight percent, and most preferably less than or equal to about 70 weight percent based on the weight of the high crystalline propylene polymer.

Part or all of the propylene polymer of the present invention may be graft modified. A preferred graft modification of the polypropylene is achieved with any unsaturated organic compound containing, in addition to at least one ethylenic unsaturation (e.g., at least one double bond), at least one carbonyl group (—C═O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound containing at least one carbonyl group can be grafted to the polypropylene by any known technique, such as those taught in U.S. Pat. Nos. 3,236,917 and 5,194,509. For example, polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. Alternatively, the reaction temperature is higher, e.g., 210° C. to 300° C., and a free radical initiator is not used or is used at a reduced concentration. An alternative and preferred method of grafting is taught in U.S. Pat. No. 4,905,541, the disclosure of which is incorporated herein by reference, by using a twin-screw devolatilizing extruder as the mixing apparatus. The polypropylene and unsaturated organic compound are mixed and reacted within the extruder at temperatures at which the reactors are molten and in the presence of a free radical initiator. Preferably, the unsaturated organic compound is injected into a zone maintained under pressure in the extruder.

The unsaturated organic compound content of the grafted polypropylene is at least about 0.01 weight percent, preferably at least about 0.1 weight percent, more preferably at least about 0.5 weight percent, and most preferably at least about 1 weight percent based on the combined weight of the polypropylene and organic compound. The maximum amount of unsaturated organic compound content can vary to convenience, but typically it does not exceed about 10 weight percent, preferably it does not exceed about 5 weight percent, more preferably it does not exceed about 2 weight percent and most preferably it does not exceed about 1 weight percent based on the combined weight of the polypropylene and the organic compound.

The polypropylene or graft-modified polypropylene is employed in the propylene polymer blend compositions of the present invention in amounts sufficient to provide the desired processability and good balance of stiffness and toughness. If present, the graft-modified polypropylene can be employed in an amount equal to 100 weight percent of the total weight of the polypropylene, preferably in an amount up to or equal to 50 weight percent, more preferably up to or equal to 30 weight percent, even more preferably up to or equal to 20 weight percent and most preferably up to or equal to 10 weight percent of the weight of the polypropylene.

The propylene polymer (i) is present in the coating composition of the present invention in an amount sufficient to be a co-continuous phase with component (ii), the substantially linear ethylene copolymer or a linear ethylene copolymer, or mixtures thereof, preferably in an amount equal to or greater than 15 weight percent, preferably equal to or greater than 30 weight percent, more preferably equal to or greater than 40 weight percent based on the total weight of the coating composition. The propylene polymer (i) is present in the coating composition of the present invention in an amount such that component (ii), the substantially linear ethylene copolymer or a linear ethylene copolymer, or mixtures thereof, is a co-continuous phase, preferably equal to or less than 85 weight percent, preferably equal to or less than 70 weight percent, more preferably equal to or less than 60 weight percent based on the total weight of the coating composition.

The second component (ii) of the coating material composition is a substantially linear ethylene copolymer (SLEP) or a linear ethylene copolymer (LEP), or mixtures thereof. As used herein, the term "S/LEP" refers to substantially linear ethylene copolymers, linear ethylene copolymers, or mixtures thereof. S/LEP copolymers are made using a constrained geometry catalysts, such as a metallocene catalysts. S/LEP copolymers are not made by conventional polyethylene copolymer processes, such as Ziegler Natta catalyst polymerization (HDPE) or free radical polymerization (LDPE and LLDPE).

Both substantially linear ethylene polymers and linear ethylene polymers are known. Substantially linear ethylene polymers and their method of preparation are fully described in U.S. Pat. Nos. 5,272,236 and 5,278,272. Linear ethylene polymers and their method of preparation are fully disclosed in U.S. Pat. Nos. 3,645,992; 4,937,299; 4,701,432; 4,937,301; 4,935,397; 5,055,438; EP 129,368; EP 260,999; and WO 90/07526.

Suitable S/LEP copolymers comprises two or more $C_2$ to $C_{20}$ alpha-olefins, preferably ethylene and one or more $C_3$ to $C_{20}$, more preferably one or more $C_4$ to $C_{20}$ alpha-olefins in polymerized form, having a $T_g$ less than 25° C., preferably less than 0° C., most preferably less than −25° C. Examples of the types of copolymers from which the present S/LEP are selected include copolymers of alpha-olefins, such as ethylene and 1-butene, ethylene and 1-hexene, or ethylene and 1-octene copolymers, and terpolymers of ethylene, propylene and a diene comonomer such as hexadiene or ethylidene norbornene, most preferred is ethylene and propylene.

As used here, "a linear ethylene copolymer" means a copolymer of ethylene and one or more alpha-olefin comonomers having a linear backbone (i.e., no cross linking), no long-chain branching, a narrow molecular weight distribution and, a narrow composition distribution. Further, as used here, "a substantially linear ethylene copolymer" means a copolymer of two or more $C_2$ to $C_{20}$ alpha-olefins, preferably ethylene and of one or more $C_3$ to $C_{20}$ alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by in situ generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n–2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Preferred substantially linear ethylene polymers are prepared by using metallocene based catalysts. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene copolymers or linear ethylene copolymers is equal to or greater than about 0.850 grams per cubic centimeter ($g/cm^3$), preferably equal to or greater than about 0.860 $g/cm^3$, and more preferably equal to or greater than about 0.873 $g/cm^3$. Generally, the density of these substantially linear ethylene copolymers or linear ethylene copolymers is less than or equal to about 0.93 $g/cm^3$, preferably less than or equal to about 0.900 $g/cm^3$, and more preferably equal to or less than about 0.885 $g/cm^3$. The melt flow ratio for substantially linear ethylene copolymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram (kg) mass. $I_{10}$ is measured according to ASTM Designation D 1238 using conditions of 190° C. and 10.0 kg mass.

The $M_w/M_n$ for substantially linear ethylene copolymers is the weight average molecular weight ($M_w$) divided by number average molecular weight ($M_n$). $M_w$ and $M_n$ are measured by gel permeation chromatography (GPC). For substantially linear ethylene copolymers, the $I_{10}/I_2$ ratio indicates the degree of long-chain branching, i.e. the larger the $I_{10}/I_2$ ratio, the more long-chain branching exists in the copolymer. In preferred substantially linear ethylene copolymers $M_w/M_n$ is related to $I_{10}/I_2$ by the equation: $M_w/M_n \leq (I_{10}/I_2)-4.63$. Generally, $M_w/M_n$ for substantially linear ethylene copolymers is at least about 1.5 and preferably at least about 2.0 and is less than or equal to about 3.5, more preferably less than or equal to about 3.0. In a most preferred embodiment, substantially linear ethylene copolymers are also characterized by a single DSC melting peak.

The preferred $I_2$ melt index for these substantially linear ethylene copolymers or linear ethylene copolymers is from about 0.01 g/10 min to about 100 g/10 min, more preferably about 0.1 g/10 min to about 10 g/10 min, and even more preferably about 1 g/10 min to about 5 g/10 min.

The preferred $M_w$ for these substantially linear ethylene copolymers or linear ethylene copolymers is equal to or less than about 180,000, preferably equal to or less than about 160,000, more preferably equal to or less than about 140,000 and most preferably equal to or less than about 120,000. The preferred $M_w$ for these substantially linear ethylene copolymers or linear ethylene copolymers is equal to or greater than about 40,000, preferably equal to or greater than about 50,000, more preferably equal to or greater than about 60,000, even more preferably equal to or greater than about 70,000, and most preferably equal to or greater than about 80,000.

In one embodiment, the S/LEP used in the process of the present invention may be graft modified. A preferred graft modification of the S/LEP is achieved with any unsaturated organic compound containing, in addition to at least one ethylenic unsaturation (e.g., at least one double bond), at least one carbonyl group (—C═O) and that will graft to a S/LEP as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the grafted S/LEP is at least about 0.01 weight percent, preferably at least about 0.1 weight percent, more preferably at least about 0.5 weight percent, and most preferably at least about 1 weight percent based on the combined weight of the S/LEP and organic compound. The maximum amount of unsaturated organic compound content can vary to convenience, but typically it does not exceed about 10 weight percent, preferably it does not exceed about 5 weight percent, more preferably it does not exceed about 2 weight percent and most preferably it does not exceed about 1 weight percent based on the combined weight of the S/LEP and the organic compound.

The S/LEP copolymer (ii) is present in the coating composition of the present invention in an amount sufficient to be a co-continuous phase with the propylene polymer (i), preferably equal to or greater than 15 weight percent, preferably equal to or greater than 20 weight percent, more preferably equal to or greater than 30 weight percent based on the total weight of the coating composition. The S/LEP copolymer (ii) is present in the coating composition of the present invention in an amount which allows for the propylene polymer (i) to be a co-continuous phase, preferably equal to or less than 85 weight percent, preferably equal to or less than 70 weight percent, more preferably equal to or less than 60 weight percent based on the total weight of the coating composition.

Optionally, the coating material composition may further comprise a filler (iii). Examples of suitable fillers are calcium carbonate, talc, clay, mica, wollastonite, hollow glass beads, titanium oxide, silica, carbon black, glass fiber, potassium titanate and the like. Preferred fillers are talc, wollastonite, clay, single layers of a cation exchanging layered silicate material or mixtures thereof. Talcs, wollastonites, and clays are generally known fillers for various polymeric resins. See for example U.S. Pat. Nos. 5,091,461 and 3,424,703; EP 639,613 A1; and EP 391,413, where these materials and their suitability as filler for polymeric resins are generally described.

If present, the filler is employed in an amount equal to or greater than 1 percent, preferably equal to or greater than 2 percent, more preferably equal to or greater than 5 percent, even more preferably equal to or greater than 7.5 percent, and most preferably equal to or greater than 10 percent based on the total weight of the coating material composition. If present, the filler is employed in an amount equal to or less than 60 percent, preferably equal to or less than 50 percent, more preferably equal to or less than 40 percent, even more preferably equal to or less than 20 percent, and most preferably equal to or less than 15 percent based on the total weight of the coating material composition.

In one embodiment the method of the present invention, is a method of coating a pipeline field joint between two joined lengths of pipe, each length comprising a polypropylene pipe coating along part of its length and an uncoated end portion between where the polypropylene pipe coating ends and the field joint, the method comprising the step of (a) fitting a split injection mold around the joined lengths of pipe such that it overlaps with and extends between the polypropylene pipe coating of each of the two lengths of pipe and (b) injection molding a coating material composition into injection mold, wherein the coating material composition comprises (i) a propylene polymer and (ii) a substantially linear ethylene copolymer (SLEP), a linear ethylene copolymer (LEP), or mixtures thereof.

Examples

The following components are used in Example 1 and Comparative Example A:

"PP-1" is a commonly used injection moldable impact modified polypropylene used for steel pipe coating applications having good low temperature impact resistance and a melt flow rate of 0.3 g/10 min (230° C./2.16 kg).

"ENGAGE™ 8842" available from The Dow Chemical Company is a metallocene catalyzed ultra-low density (0.857 g/cc.) ethylene-octene copolymer with a melt index of 1 g/10 min (190° C./2.16 kg).

Comparative Example A is PP-1.

Example 1 is a 70:30 melt blend of PP-1: ENGAGE 8842.
Melt Compounding.

For Example 1, the PP-1: ENGAGE 8842 are dry blended in a plastic bag. Air is introduced into the bag to blow it into a ball shape. The opening of the bag is tightly closed, for the air not to escape out. The bag is hand-shaken multiple times in order to achieve a well-mixed blend of resins and additives. The mixed blend is then gravity fed by a feeder into a hopper—that fed down into the barrel of a Micro-18 twin-screw extruder. The feeding is started at about 2.2 lbs/hour and then is increased to 4 lbs/hour later as the torque and pressure in the extruder became more stable. The pellets flew from the hopper down through the feed throat, which dispensed them onto a two spinning screw at the speed of 200 rpm operating within a horizontal barrel. The pellets passed through the barrel on the screws while being heated. The barrel of the extruder had controlled heat zones which are pre-heated at 140, 160, 180, 190, 200 and 200° C. going from feed to die section. By the time the resin reached the end of the screw length, it is thoroughly mixed and got pushed through a screen and then the die of the extruder. The hot polymer came out of the die in string shape and is then cooled by blowing air from fans. The product is achieved by pulling the string through a chopper and then got cut into pellets at the speed of 3.8 rpm.
Ring Shear Specimen Preparation.

A round tube made of low carbon steel was cut into a length of 4 inches long using a band saw. The outer diameter of the tube is 2 inches" and wall thickness was 0.04 inch". 4 inch segments are then blasted using a silica based medium to remove all oil, rust, debris etc., from the surface of the tube. The 4 inch segments are rinsed with acetone and dried using nitrogen. This metal tube is concentrically attached to a metal pan of 6 inch diameter with a high temperature tacky tape. The space between metal tube and metal pan is filled with the extruded polymer coming out of the die of a Micro-18 extruder. Once filled to the top level of the metal pan, the polymer is allowed to cool with time, FIG. 1.

The following tests are performed on Comparative Example A and Example 1 and the results are reported in Table 1:
Residual Stress Measurement.

Reducing the residual stress in the field joint material is one of the key requirements for new material development for the field joint. A push-out experiment is conducted with the ring shear specimens described herein above on a mechanical test frame Instron 5581 at a displacement rate of 0.05"/min to push the metal tube out of the polymer. Initial peak is high and then it has a plateau that indicates frictional sliding of the polymer against the metal tube. A schematic of the load-displacement curve as well as the free body diagram of the push out experiment is shown in FIG. 2 and FIG. 3, respectively.

From the plateau region of the force-displacement curve, the load is averaged over a range of 10 mm displacement. After completing the ring shear experiment, samples are weighed and volume is calculated. Since the pan area is same, height of the polymer in each specimen is calculated. This height is needed to calculate the overall residual stress. In the frictional sliding region, the tangential force is essentially the force measured by the ring shear testing. The coefficient of friction (μ) was measured in an ASTM characterization lab and an average value of 0.58 is considered for all specimens. This is one of the assumption in the calculation that the COF does not significantly change between specimens due to addition of elastomers. Residual stress can be estimated as $$\sigma = \frac{P}{\mu A}$$

where P is the push-our force measured and A is the surface area of the polymer in contact with the steel tube. 3 specimens are prepared for Comparative Example A and Example 1 and an average value is reported.

TABLE 1

| Property | Comparative Example A | Example 1 |
| --- | --- | --- |
| Residual Stress, MPa | 0.87 | 0.27 |

Morphology Analysis.

After testing ring shear specimen, 1 cm by 1.5 cm by 0.4 cm piece is cut from the bulk sample to reveal a view from the center of the thickness, FIG. 4. Two locations, one close to the metal tube and one close to the periphery of the specimen, are analyzed. The purpose of analyzing these two location is to check if boundary conditions has any effect during the crystallization process which may have impact on the morphology. A block face is established using a razor blade then cryogenically polished to produce a planerized surface. A Leica UC7/FCS ultramicrotome, fitted with diamonds knives, was operated at −140° C. A Brüker Dimension ICON atomic force microscope (AFM) is operated in tapping mode for phase detection. A NanoScope V controller operates with NanoScope v8.15 operating software. Tips used for all scans: Mikro Masch #16 NSC without Al backside coating. Tips have a resonance frequency of about 170 kHz and a force constant of about 40 N/m. I mage post-processing and analysis is done using Image Analysis SPIP v6.5.2 and shown for Comparative Example A, FIG. 5 and Example 1, FIG. 6.

What is claimed is:

1. A method of coating a pipeline field joint between two joined lengths of pipe, each length comprising a polypropylene pipe coating along part of its length and an uncoated end portion between where the polypropylene pipe coating ends and the field joint, the method comprising the step of
   (a) applying a layer of a coating material composition to the uncoated region of the field joint such that it overlaps with and extends continuously between the polypropylene pipe coating of each of the two lengths of pipe, wherein the coating material composition comprises
      (i) a propylene polymer and
      (ii) a substantially linear ethylene copolymer (SLEP), a linear ethylene copolymer (LEP), or mixtures thereof, wherein the SLEP and/or LEP is a copolymer of ethylene with one or more $C_3$ to $C_{20}$ alpha olefin,
   wherein the propylene polymer and the substantially linear ethylene copolymer (SLEP), a linear ethylene copolymer (LEP), or mixtures thereof form co-continuous phases, wherein the propylene polymer is present in the coating composition in an amount of equal to or greater than 15 weight percent and equal to or less than 85 weight percent, and the SLEP and/or LEP is present in the coating composition in an amount equal to or greater than 15 weight percent and equal to or less than 85 weight percent, wherein the weight percents are based on the total weight of the coating composition.

2. The method of claim 1 wherein the propylene polymer is a propylene block or random copolymer.

3. The method of claim 1 wherein the SLEP and/or LEP is characterized as having
   (a) a density of less than about 0.873 g/cc to 0.885 g/cc and/or
   (b) an $I_2$ of from greater than 1 g/10 min to less than 5 g/10 min.

4. The method of claim 3 wherein the SLEP and/or LEP is a copolymer of ethylene and propylene, ethylene and 1-butene, ethylene and 1-hexene, ethylene and 1-octene, or a terpolymer of ethylene, propylene, and a diene comonomer.

5. The method of claim 1 wherein the SLEP and/or LEP is produced using a constrained geometry catalyst.

6. The method of claim 1 wherein
   (i) the propylene polymer is present in the coating composition in an amount of equal to or greater than 50 weight percent and equal to or less than 85 weight percent and
   (ii) the SLEP and/or LEP is present in the coating composition in an amount equal to or greater than 15 weight percent and equal to or less than 50 weight percent, wherein weight percents a based on the total weight of the coating composition.

7. The method of claim 1 wherein the coating material composition is applied by injection molding.

8. A method of coating a pipeline field joint between two joined lengths of pipe, each length comprising a polypropylene pipe coating along part of its length and an uncoated end portion between where the polypropylene pipe coating ends and the field joint, the method comprising the step of
   (a) fitting a split injection mold around the joined lengths of pipe such that it overlaps with and extends between the polypropylene pipe coating of each of the two lengths of pipe and
   (b) injection molding a coating material composition into injection mold, wherein the coating material composition comprises
      (i) a propylene polymer and
      (ii) a substantially linear ethylene copolymer (SLEP), a linear ethylene copolymer (LEP), or mixtures thereof, wherein the SLEP and/or LEP is a copolymer of ethylene with one or more $C_3$ to $C_{20}$ alpha olefin, wherein the propylene polymer and the substantially linear ethylene copolymer (SLEP), a linear ethylene copolymer (LEP), or mixtures thereof form co-continuous phases, wherein the propylene polymer is present in the coating composition in an amount of equal to or greater than 15 weight percent and equal to or less than 85 weight percent, and the SLEP and/or LEP is present in the coating composition in an amount equal to or greater than 15 weight percent and equal to or less than 85 weight percent, wherein the weight percents are based on the total weight of the coating composition.

\* \* \* \* \*